United States Patent [19]

Wo-Hsi

[11] Patent Number: 5,033,224
[45] Date of Patent: Jul. 23, 1991

[54] FISHING REEL FOOT FIXING DEVICE
[75] Inventor: Wu Wo-Hsi, Kaohsiung, Taiwan
[73] Assignee: Daiwa Seiko, Inc., Tokyo, Japan
[21] Appl. No.: 546,868
[22] Filed: Jul. 2, 1990
[30] Foreign Application Priority Data
Nov. 28, 1989 [JP] Japan .................. 1-137426
[51] Int. Cl.⁵ .............................................. A01K 87/06
[52] U.S. Cl. ............................................. 43/22; 43/23
[58] Field of Search ........................................ 43/22, 23
[56] References Cited

U.S. PATENT DOCUMENTS

| 1,745,398 | 2/1930 | Beaty | 43/22 |
| 3,197,908 | 8/1965 | Hirsch | 43/23 X |
| 4,802,299 | 2/1989 | Ohmura | 43/22 |
| 4,839,981 | 6/1989 | Yasui | 43/23 X |
| 4,864,764 | 9/1989 | Yamato | 43/22 |

Primary Examiner—Kurt Rowan
Assistant Examiner—Patty E. Hong
Attorney, Agent, or Firm—Kalish & Gilster

[57] ABSTRACT

The present invention relates to a fishing reel foot fixing device for fixing a reel foot on a fishing rod. According to the present invention, a removable spacer is arranged between the moving hood and the handle of the reel foot mounting portion to fill a step-like gap produced between them. Therefore, any size of step-like gap produced between the moving hood and the handle when another reel having a shorter or longer reel foot is used can be eliminated only by replacing the spacer. Even if replacement of the reel leads to a change in the reel foot length, the spacer used so far can be replaced with another one of an appropriate size.

6 Claims, 3 Drawing Sheets

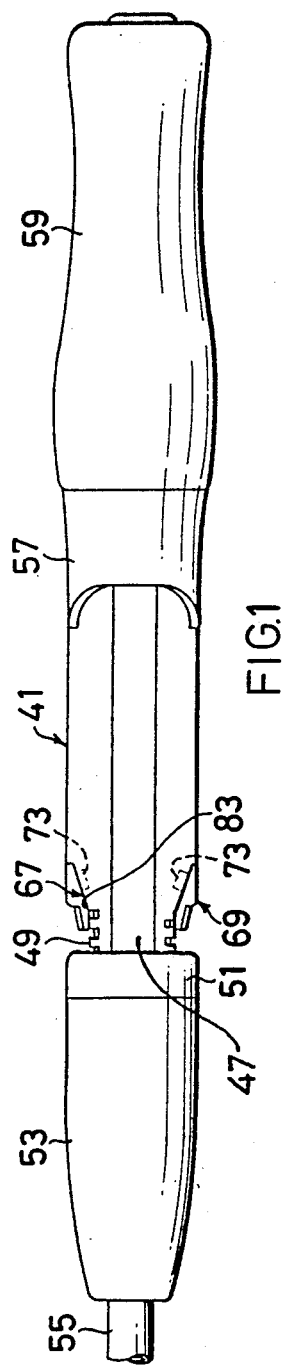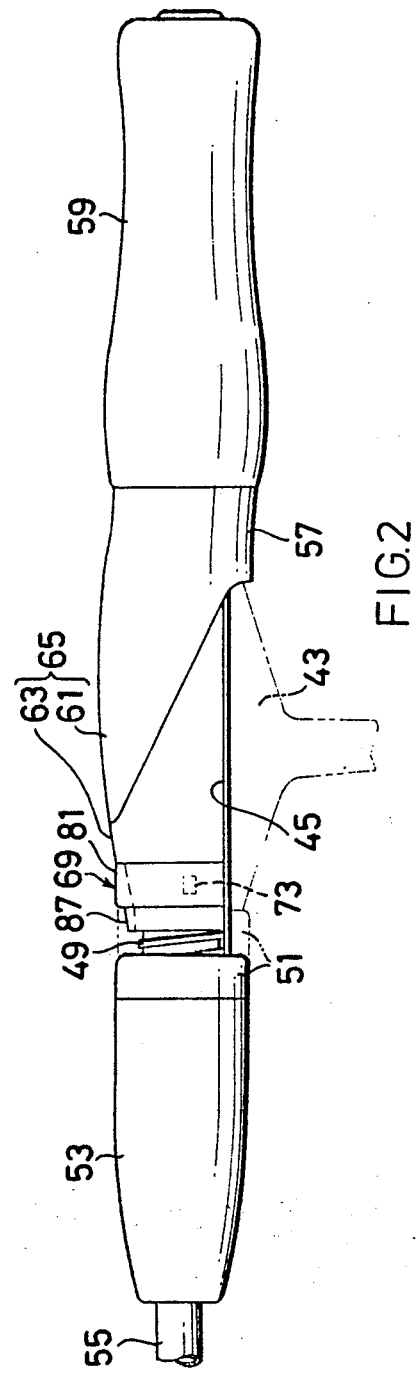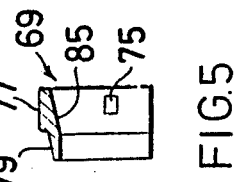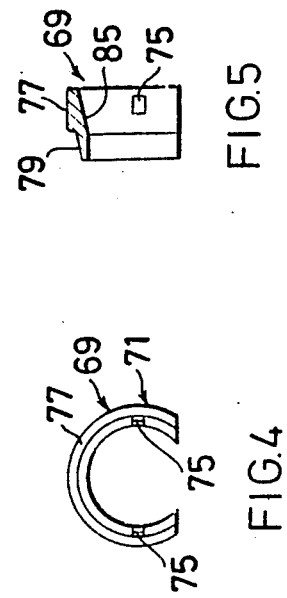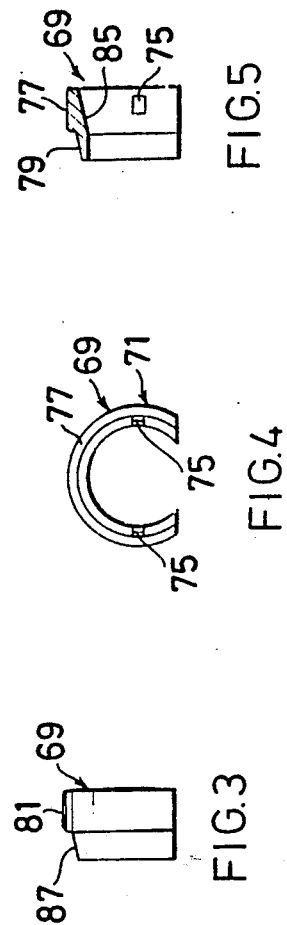

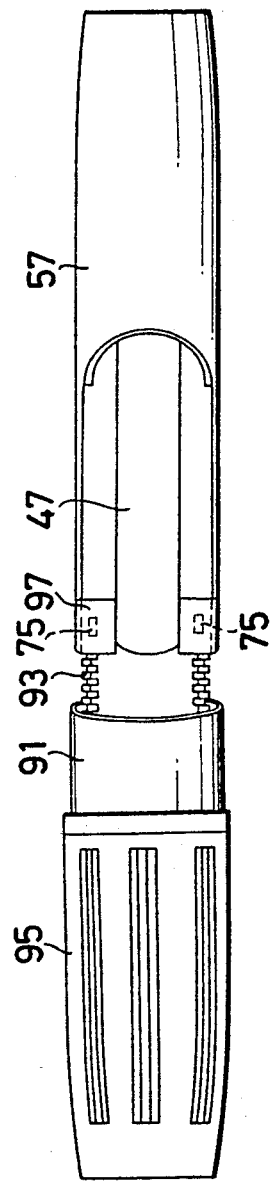
FIG.6
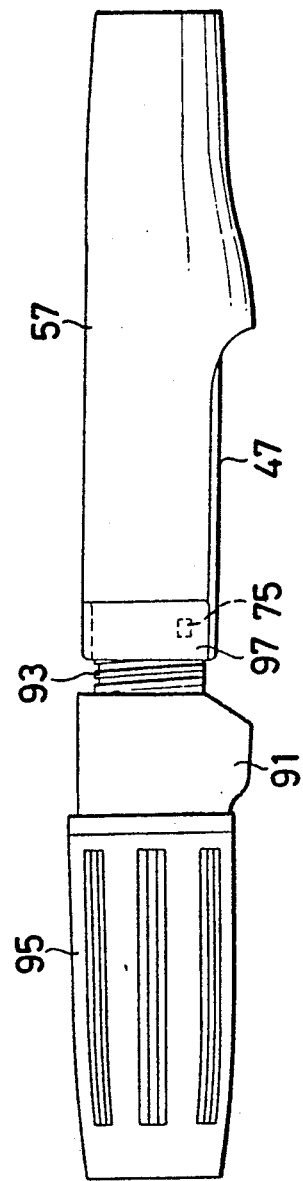
FIG.7
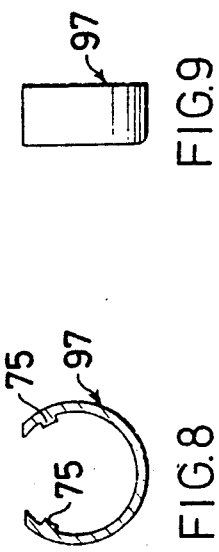
FIG.9
FIG.8

FISHING REEL FOOT FIXING DEVICE

BACKGROUND OF THE INVENTION

1. Field of the Invention

This invention relates to a fishing rod, and more particularly to a fishing reel foot fixing device for fixing a reel foot on a fishing rod.

2. Description of the Prior Art

For a fishing rod with a reel, a reel foot fixing device is usually provided to fix the reel foot.

FIGS. 10 and 11 show a prior fishing reel foot fixing device. In the figures, the reference numeral 11 is a reel foot mounting portion.

The reel foot mounting portion 11 has a reel foot mounting surface 17 formed longitudinally to hold a mounting surface 15 of a reel foot 13 against the reel foot mounting surface.

In an extension ahead of the reel foot mounting portion 11, an external thread (not shown) is formed with a moving hood 21 and a foregrip 23 arranged outside the external thread.

The foregrip 23 is engaged with the external thread and rotation of the foregrip 23 causes the moving hood 21 to move in a longitudinal direction.

Ahead of the external thread, a rod butt 25 is also arranged.

In the rear of the reel foot mounting portion 11, a stationary hood 27 and a butt grip 29 are arranged.

In addition, a portion 31 having the stationary hood 27 extended toward the reel foot mounting portion 11 and a curved portion 33 located ahead of the reel foot mounting portion 11 cooperate to form a handle 35, which covers the whole reel foot mounting portion 11 except the reel foot mounting surface 17.

For the prior fishing reel foot fixing device thus configured with the mounting surface 15 of the reel foot 13 held against the reel foot mounting surface 17 of the reel foot mounting portion 11, rotating and moving the foregrip 23 toward the reel foot mounting portion 11 causes the moving hood 21 to move toward the reel foot mounting portion 11, thereby causing the front and rear ends of the foot 13 to be fixed between the stationary hood 27 and the moving hood 21 for complete fixture.

Thus, such a prior fishing reel foot fixing device has its fixing effect relying upon its tightening force produced by both the moving hood 21, moved according to the rotation of the foregrip 21, and the stationary hood 27. However, various sizes of reels are actually used and the size of reel feet vary accordingly. To ensure the fixing effect equally on any size of reel, the reel foot mounting portion 11 must be smaller (shorter) for smaller reels. For a larger reel fixed on the prior fishing reel foot fixing device, a step-like gap 37 is produced between the moving hood 21 and the handle 35 as shown in FIG. 11. This gap may feel uncomfortable and moreover, may hurt or damage the user's hand.

Other prior fishing reel foot fixing devices which remedy the problems above are well known to those skilled in the art. For example, one of them has been disclosed in Japanese Utility Model Application Laid-open No. 165166/88. That fishing reel foot fixing device has a thick portion covering the whole reel foot mounting portion except the reel foot mounting surface, and a step-like gap formed on the thick portion is engaged with a moving hood. The thick portion and the moving hood is smoothly movably coupled with the thick portion. However, when the reel used has a mounting surface longer than expected, a step-like gap is produced between the thick portion and the moving hood. On the other hand, when the mounting surface is shorter, the foot itself cannot be fixed on the reel.

SUMMARY OF THE INVENTION

It is an object of the present invention to provide a fishing reel foot fixing device, which can eliminate a possible step-like gap between the moving hood and the handle for fishing reels with various foot lengths.

The present invention is characterized in that a removable spacer is arranged between the moving hood and the handle of the reel foot mounting portion to fill a possible step-like gap between those members. Therefore, any size of step-like gap produced between the moving hood and the handle when another reel having a shorter or longer reel foot is used can be eliminated by only replacing the spacer.

Even if replacement of the reel leads to a change in the reel foot length, the spacer used so far can be replaced with another one of appropriate size.

BRIEF DESCRIPTION OF THE DRAWINGS

FIG. 1 is a bottom view showing an embodiment of the present fishing reel foot fixing device.

FIG. 2 is a side elevational view of the fishing reel foot fixing device shown in FIG. 1.

FIG. 3 is a side elevational view of the spacer shown in FIG. 1.

FIG. 4 is a front view of the spacer shown in FIG. 3.

FIG. 5 is a vertical section of the spacer shown in FIG. 3.

FIG. 6 is a bottom view showing another embodiment of the present fishing reel foot fixing device.

FIG. 7 is a side elevational view of the fishing reel foot fixing device shown in FIG. 6.

FIG. 8 is a vertical section of the spacer shown in FIG. 6.

FIG. 9 is a side elevational view of the spacer shown in FIG. 8.

DESCRIPTION OF THE PREFERRED EMBODIMENTS OF THE INVENTION

Figure 10:
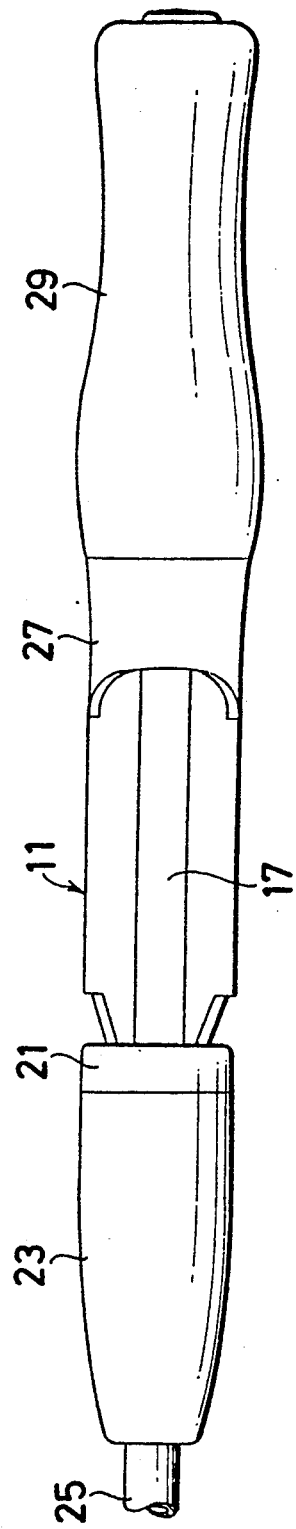
FIG. 10 is a bottom view showing a prior fishing reel foot fixing device.
Figure 11:
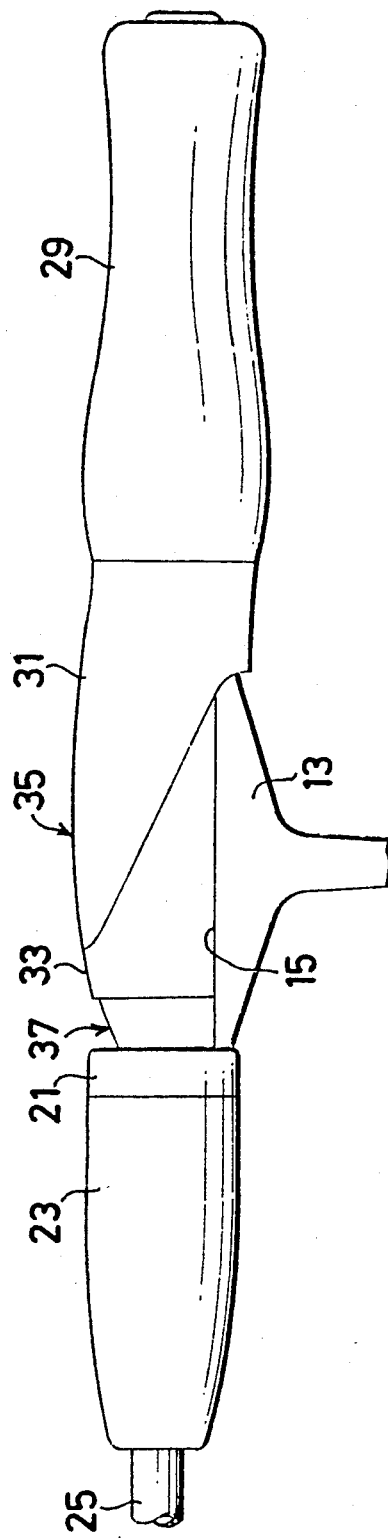
FIG. 11 is a side elevational view of the prior fishing reel foot fixing device shown in FIG. 10.

Referring to the attached drawings, an embodiment of the present invention will be described below in detail.

FIGS. 1 and 2 show one embodiment of the present fishing reel foot fixing device and in the figures, the reference numeral 41 is a reel foot mounting portion.

The reel foot mounting portion 41 has a reel foot mounting surface 47 formed longitudinally to hold a mounting surface 45 of a reel foot 43 against the reel foot mounting surface.

In an extension ahead of the reel foot mounting portion 41, an external thread 49 is formed with a moving hood 51 and a foregrip 53 arranged outside the external thread 49.

The foregrip 53 is engaged with the external thread 49 and rotation of the foregrip 53 causes the moving hood 51 to move in a longitudinal direction.

Ahead of the external thread 49, a rod butt 55 is also arranged.

In the rear of the reel foot mounting portion 41, a stationary hood 57 and a butt grip 59 are arranged.

In addition, a portion 61 having the stationary hood 57 extended toward the reel foot mounting portion 41 and a curved portion 63 located ahead of the reel foot mounting portion 41 cooperate to form a handle 65, which covers the whole reel foot mounting portion 41 except the reel foot mounting surface 47.

The present embodiment has a removable spacer 69 arranged between the moving hood 51 and the handle 65 to fill a step-like gap 67 produced there.

FIGS. 3 through 5 show the spacer 69 in detail. As shown in the figures, the spacer 69 is provided with a centrally notched cylindrical body 71 for conforming to the reel foot mounting surface 47 and a pair of engaging projections 75 formed on the body 71 projecting inward for engagement with corresponding recesses 73 located in the reel foot mounting portion 41.

According to the present embodiment, the spacer 69 consists of a large-diameter portion 77 and a small-diameter portion 79.

The outer diameter 81 of the large-diameter portion 77 is almost equal to that of the end of the handle 65. The inner surface of the large-diameter portion 77 is such a tapered surface 85 that it fits another tapered surface 83 formed in the reel foot mounting portion 41.

Further, the tapered surface 85 carries said pair of engaging projections 75 facing each other in oppositely disposed relationship.

The outer surface of the small-diameter portion 79 is also a tapered surface 87.

The spacer 69 is preferably made of synthetic resin, rubber, or other elastic materials but may be made of metal or composite materials.

For the present fishing reel foot fixing device thus configured with the mounting surface 45 of the reel foot 43 held against the reel foot mounting surface 47 of the reel foot mounting portion 41, rotating and moving the foregrip 53 toward the reel foot mounting portion 41 cause the moving hood 51 to move toward the reel foot mounting portion 41, thereby causing the front and rear ends of the foot 43 to be fixed between the stationary hood 57 and the moving hood 51 for complete fixture.

The fixture of the spacer 69 to the reel foot mounting portion 41 is accomplished by forcing the spacer 69 onto the reel foot mounting surface 47 with the notched portion of the body 71 of the spacer 69 held against the reel foot mounting portion 41 opposite to the reel foot mounting surface 47, expanding the notched portion of the body 71 by means of elasticity, and then pushing the body 71 to engage the engaging projection 75 formed on the body 71 inward with the recess 73 located in the reel foot mounting portion 41.

As described above in detail, according to the present fishing reel foot fixing device, the spacer 69 is removably arranged between the moving hood 51 and the handle 65 of the reel foot mounting portion 41 to fill the step-like gap 67 produced between them. Therefore, any size of step-like gap 67 produced between the moving hood 51 and the handle 65 when another reel having a shorter or longer reel foot 43 is used can be eliminated by only replacing the spacer 69.

In addition, according to the present embodiment, the spacer 69 consists of the notched cylindrical body 71 having the reel foot mounting surface 47 notched and the engaging projection 75 formed on the body 71 projecting inward for engagement with the recess 73 located in the reel foot mounting portion 41. This configuration can make it easier more secure to attach the spacer 69 to the reel foot mounting portion 41.

FIGS. 6 and 7 show another embodiment of the present fishing reel foot fixing device. In the embodiment, a tightening cylinder 95 is arranged adjacent to a moving hood 91 to be engaged with an external thread 93.

This embodiment also employs a spacer 97 which has simple linear outer and inner diameters as shown in FIGS. 8 and 9.

The second embodiment thus configured has substantially the same fixing effect as the first embodiment shown in FIG. 1.

From the foregoing, the spacer 69 according to the first embodiment contains the engaging projection 75 for engagement with the recess 73 on the reel foot mounting portion 73. It should be noted however, that, the present invention is not limited to that embodiment and the spacer 69 itself may contain a recess to be engaged with an engaging projection formed on the reel foot mounting portion 41.

Further, in the first embodiment, the engagement between the spacer 69 and the reel foot mounting portion 41 is accomplished by means of the engaging projection 75 and the recess 73. It should be noted that, however, the present invention is not limited to that embodiment and that engagement between those members may be accomplished by providing grooves in them or by using screws.

Moreover, the spacer 69 according to the first embodiment is engaged with the reel foot mounting portion 41 by means of elasticity of the spacer 69. It should be noted however, that the present invention is not limited to that embodiment and the engagement may be accomplished by press fitting.

In the first embodiment described above, the spacer 69 is attached to the reel foot mounting portion 41 on the side of the handle 65 only. It should be noted however, that the present invention is not limited to that embodiment and the spacer 69 may also cover the reel foot mounting surface.

As stated above repeatedly, the present invention is not limited to those embodiments and it may be applicable to a cylindrical reel seat, a reel seat formed integrally with a fishing rod, or a cast handle.

Still further, any small gap between the moving hood and the handle can be eliminated by using a difference in tightening force of the moving hood which is obtained by forming the spacer, in whole or in part, of rubber or any other elastic material.

What is claimed is:

1. A fishing reel foot fixing device in which a reel foot mounting portion has a reel foot mounting surface formed longitudinally, a pair of hoods, at least one of which is a moving hood, are arranged at each end of said reel foot mounting portion, and a handle is formed to cover said reel foot mounting portion except said reel foot mounting surface, wherein a removable spacer is arranged between said moving hood and said handle of said reel foot mounting portion to fill a step-like gap produced between them, and wherein said spacer is provided with a cylindrical body centrally notched for conforming to said reel foot mounting surface and comprises an engaging projection formed on said body projecting inward for engagement with a corresponding recess located in said reel foot mounting portion.

2. A fishing reel foot fixing device according to claim 1, wherein said spacer consists of a large-diameter portion and a small-diameter portion.

3. A fishing reel foot fixing device according to claim 2, wherein the outer diameter of said large-diameter portion is almost equal to that of the end of said handle and the inner surface of said large-diameter portion is such a tapered surface that it fits another tapered surface formed in said reel foot mounting portion.

4. A fishing reel foot fixing device according to claim 2, wherein the outer surface of said small-diameter portion is a tapered surface.

5. A fishing reel foot fixing device according to claim 1, wherein said spacer is made of an elastic material.

6. A fishing reel foot fixing device in which a reel foot mounting portion has a reel foot mounting surface formed longitudinally, a pair of hoods, at least one of which is a moving hood, arranged at each end of said reel foot mounting portion, and a handle formed to cover said reel foot mounting portion except said reel foot mounting surface, wherein a removable spacer is arranged between said moving hood and said handle of said reel foot mounting portion to fill a step-like gap produced between them, said spacer is provided with a cylindrical body centrally notched for conforming to said reel foot mounting surface, and consists of a large-diameter portion and a small-diameter portion, the outer diameter of said large-diameter portion being almost equal to that of the end of said handle, and the inner surface of said large-diameter portion is such a tapered surface that it fits another tapered surface formed in said reel foot mounting portion, and wherein said tapered surface of said large-diameter portion has a pair of engaging projections facing each other in oppositely disposed relationship, to be received by corresponding recesses located in said reel foot mounting portion.

* * * * *